Figure 2:
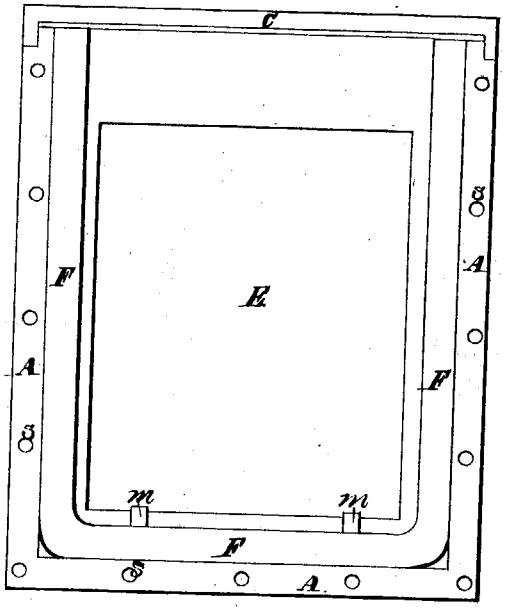
Figure 3:
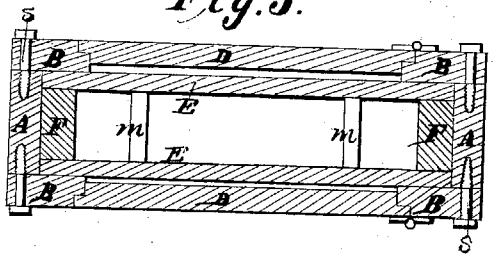
Figure 1:
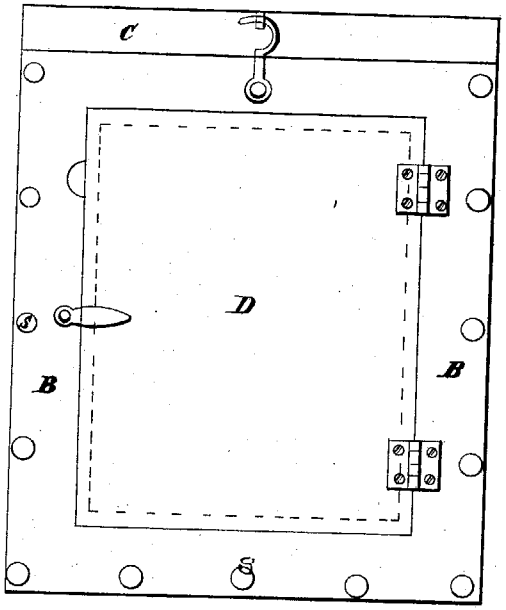

B. Hufnagel,

Photographic Bath,

No. 1,152, Reissued Mar. 19, 1861.

Witnesses.

Henry C. Roeder

Julian Keen.

Inventor.

Burkhard Hufnagel

AM. PHOTO-LITHO. CO. N.Y. (OSBORNE'S PROCESS)

UNITED STATES PATENT OFFICE.

BERNHARD HUFNAGEL, OF NEW YORK, N. Y.

IMPROVEMENT IN PHOTOGRAPHIC BATHS.

Specification forming part of Letters Patent No. 21,679, dated October 5, 1858; Reissue No. 1,074, dated November 13, 1860; Reissue No. 1,152, dated March 19, 1861.

*To all whom it may concern:*

Be it known that I, BERNHARD HUFNAGEL, of New York, in the county and State of New York, have invented a new and useful Improvement in Photographic Baths; and I hereby declare that the following is a full and exact description of the same, reference being had to the accompanying drawings, and to the letters of reference marked thereon.

Figure I represents an outside view; Fig. II a cross-section, and Fig. III a horizontal section, of my improved silver bath.

My invention relates to silver baths for photographic and ambrotype purposes, principally of the largest size, so as to require the smallest quantity of solution of silver, and to preserve said solution from all foreign action, so as to be able to use the same a great number of times and until the silver is all absorbed.

The nature of my invention consists in the combination of an outer casing with plates of glass forming together a silver bath, said casing being arranged with doors or panels to give ready access to the glass plates forming part of the bath, for the purpose of examining the solution contained in the bath, and, further to allow, through the manner of constructing said outer casing, the packing between the glass plates to be easily tightened up at any time to prevent any leakage.

In the accompanying drawings, A is a framing, to which the front and back sides, B B′, are fastened, by means of screws S, so as to form together a close box or outer casing. C is a cover, turning on hinges and fitting tight over the ends of said box, and secured by a small staple-hook, *h*. The front and back sides, B B′, are arranged with doors or panels D D′, for the purpose of examining the solution of silver in the bath without the necessity of emptying said solution each time, said doors or panels being so arranged as to close perfectly tight and not to admit any light to the inside of the box when closed.

E E are two plates of glass fitted to the frame A, and forming together with the same a box open at the top. F is a piece of vulcanized india-rubber placed on the outer edges and between the two glass plates, on both sides and bottom, forming a joint around the sides and bottom of the glass plates, and at the same time preventing the solution of silver from coming in contact with the frame A, which contains and supports the two plates of glass E E. Instead of one continued piece of india-rubber, several pieces may be used. The cover of the box is lined on the inside with a thin sheet of rubber, *n*, to prevent any detrimental action of the solution upon this wooden part of the box. *m m* are small pieces of india-rubber fastened to the bottom for the photograph and ambrotype plates to rest on.

In constructing and putting together my improved silver baths the thickness of the glass plates E E and of the india-rubber packing F is made according to the size of the bath, together from one-eighth of an inch to half an inch thicker than the wooden frame or sides of the box A. The plates of glass, with their packing between, are then placed into this frame A and the sides B and B′ screwed on the frame A, pressing at the same time the india-rubber packing by means of the screws S so much together as to form perfectly-tight joints between the india-rubber and the plates of glass, said india-rubber forming then an inner lining on the sides and bottom of the silver bath and effectually protecting the wooden part of the box or frame A from the action of the solution of silver or any other chemical solution in the bath. One of the sides B or B′ may be first firmly secured to the frame A before the plates of glass are put in their places, and the india-rubber joint pressed tight by means of the other side. If at any future time this packing should begin to leak, the width of the framing A can easily be reduced to allow the india-rubber piece F to be more compressed by means of said screws S.

I am aware that silver baths have been made of gutta-percha, china, and other different materials, either cast in one piece or made out of several pieces, and connected together in different manners. The objections to all these plans are that they take too great a quantity of the chemical solution, thereby increasing considerably the expense, and that most of these materials, and principally where cement is used, are more or less affected by the silver, and which in their turn act again upon the solution of silver, thereby producing impurities in the bath, which are detrimental to the pictures placed in said bath.

By the arrangement of panels or doors at opposite sides in the wooden box or casing I am able to see at any time if the silver bath or chemical solution is clear and pure without emptying the same into a glass bottle, as is the case by most other constructions, and, as no kind of cement is used to produce a perfect tight box, the same may at any time be easily taken apart and cleaned, besides requiring only a very small quantity of the solution to fill the bath, and, as neither the glass nor the india-rubber are affected by the silver and produce in their turn likewise no bad effect upon the solution, I can use the same longer than is at present the case, without refilling or removing the same.

Silver baths have likewise been made of glass, cemented together and afterward loosely inserted into wooden boxes or cases, but in that arrangement the box is only for the purpose of protecting the bath from injury and breakage during use and transportation, and at the same time to keep the light away from the solution, while in my improved bath, the wooden frame forms together with the two plates of glass the bath, said frame supporting and connecting together the glass plates and forming thereby a part of the box, while the vulcanized india-rubber keeps the plates of glass the proper distance apart and forms likewise a tight joint between the same, and at the same time protects the wooden part of the box, or whatever other substance said part of the box may be made of, from the action of the chemical solution.

What I claim as my invention, and desire to secure by Letters Patent, is—

1. The arrangement and use of a frame or box of wood or any other suitable material to hold together and support two plates of glass, with packing between, for the purpose of forming a silver bath for photographic and ambrotype use.

2. The application and use of india-rubber packing between the two plates of glass, for the purpose of making a tight joint between the plates at the sides and bottom, as well as to protect the frame-work from the action of the solution.

3. The construction of the outer box or case and the manner of fastening the same together by screws S, for the purpose and in the manner set forth.

4. The arrangement and use of doors or panels D D′ on opposite sides of the outer box or casings, for the purpose substantially as described.

BERNHARD HUFNAGEL.

Witnesses:
HENRY E. ROEDER,
JULIAN KEEN.